(12) United States Patent
Surnilla et al.

(10) Patent No.: US 6,591,604 B2
(45) Date of Patent: Jul. 15, 2003

(54) OXYGEN STORAGE CAPACITY ESTIMATION

(75) Inventors: Gopichandra Surnilla, West Bloomfield, MI (US); Grant Alan Ingram, West Lafayette, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/884,592

(22) Filed: Jun. 19, 2001

(65) Prior Publication Data

US 2003/0000203 A1 Jan. 2, 2003

(51) Int. Cl.$^7$ ................................................. F01N 3/00
(52) U.S. Cl. .............................. 60/277; 60/274; 60/295; 60/297; 60/286
(58) Field of Search .................... 60/277, 274, 276, 60/285, 295, 297, 301

(56) References Cited

U.S. PATENT DOCUMENTS

| | | | |
|---|---|---|---|
| 5,267,472 A | 12/1993 | Schneider et al. | |
| 5,602,737 A | 2/1997 | Sindano et al. | |
| 5,678,402 A * | 10/1997 | Kitagawa et al. | 60/276 |
| 5,713,197 A * | 2/1998 | Ogawa et al. | 60/276 |
| 5,713,199 A | 2/1998 | Takeshima et al. | |
| 5,743,084 A | 4/1998 | Hepburn | |
| 5,778,666 A | 7/1998 | Cullen et al. | |
| 5,832,722 A | 11/1998 | Cullen et al. | |
| 5,894,725 A | 4/1999 | Cullen et al. | |
| 5,896,743 A * | 4/1999 | Griffin | 60/274 |
| 6,035,632 A * | 3/2000 | Stander et al. | 60/274 |
| 6,116,021 A * | 9/2000 | Schumacher et al. | 60/274 |
| 6,125,629 A | 10/2000 | Patchett | |
| 6,173,571 B1 * | 1/2001 | Kaneko et al. | 60/286 |
| 6,233,923 B1 * | 5/2001 | Itou et al. | 60/277 |
| 6,314,723 B1 * | 11/2001 | Ketterer et al. | 60/277 |

FOREIGN PATENT DOCUMENTS

| | | |
|---|---|---|
| EP | 0936349 A2 | 8/1999 |
| WO | 0029729 | 5/2000 |

* cited by examiner

Primary Examiner—Thomas Denion
Assistant Examiner—Binh Tran
(74) Attorney, Agent, or Firm—Julia Voutyras; Allan J. Lippa

(57) ABSTRACT

An improved method for monitoring an efficiency of a three-way catalyst coupled in an exhaust passage of an internal combustion engine is presented. First, a reference efficiency estimate (shortly after a SOx purge) is generated based on several data points obtained during normal vehicle driving conditions over varying device temperatures. Next, a current efficiency estimate is obtained from several data points. The two estimates are compared to obtain a measure of reduction in the catalyst efficiency due to device sulfation.

20 Claims, 3 Drawing Sheets

OXYGEN STORAGE CAPACITY ESTIMATION

FIELD OF INVENTION

The present invention relates to a system and a method for monitoring efficiency of an exhaust gas aftertreatment device, and more particularly, to estimating a change in the oxidant storage capacity of a Lean NOx Trap due to sulfation.

BACKGROUND OF THE INVENTION

Internal combustion engines are typically coupled to an emission control device known as a three-way catalytic converter (TWC) designed to reduce combustion by-products such as carbon monoxide (Co), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap (LNT), is usually coupled downstream of an upstream three-way catalyst. The LNT stores exhaust components such as, for example, oxidants, when the engine is operating at a lean air-fuel ratio, and releases and reduces (purges) them when the engine is operating at a rich or stoichiometric air-fuel ratio.

Over time, the ability of the LNT to store exhaust components can decrease due to factors such as sulfur deposits (SOx) from the fuel. Therefore, when the LNT storage capacity is sufficiently reduced, a SOx purge has to be performed. Typically, the catalyst is heated and engine air-fuel ratio is changed to rich for SOx release and reduction. Since SOx purges result in fuel economy penalties, it is desirable not to purge unnecessarily. Thus, in order to maintain adherence to emission standards and obtain fuel economy benefits of a lean burning engine, it is desirable to monitor the capacity of the LNT to store oxidants, such as oxygen or NOx, for example.

The inventors herein have recognized a need for a more precise and robust system and method of estimating the LNT oxidant storage capacity. In particular, oxidant storage capacity of the LNT varies with changes in the LNT operating temperature achieved during normal driving conditions. Therefore, obtaining an estimate at just one operating temperature point will not provide an accurate result.

SUMMARY OF THE INVENTION

In solving the above problem, a system and a method are provided for monitoring efficiency of an exhaust gas aftertreatment device by correlating it to the device's capacity to store oxidants over an operating range.

In carrying out the above solution, features and advantages of the present invention, a system and a method for monitoring an efficiency of an exhaust gas aftertreatment device disposed in an exhaust passage of an internal combustion engine, include: generating a first device efficiency estimate by monitoring its oxidant storage capacity over on operating range of the device; subsequently generating a second device efficiency estimate by monitoring its oxidant storage capacity over said operating range; and comparing said first estimate to said second estimate.

The present invention provides a number of advantages. For example, monitoring oxidant storage capacity as a function of the LNT operating temperature allows for much more accurate estimate of the LNT efficiency than the one obtained at a single temperature point. Further, results obtained by using more than one data point are much more robust against various noise factors. This prevents unnecessary purges allowing for more lean running time, and increase fuel economy. Also, improved emission control can be achieved due to improved accuracy.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such as conventional engines in addition to direct injection stratified charge (DISC) or direct injection spark ignition engines (DISI).

Figure 1:
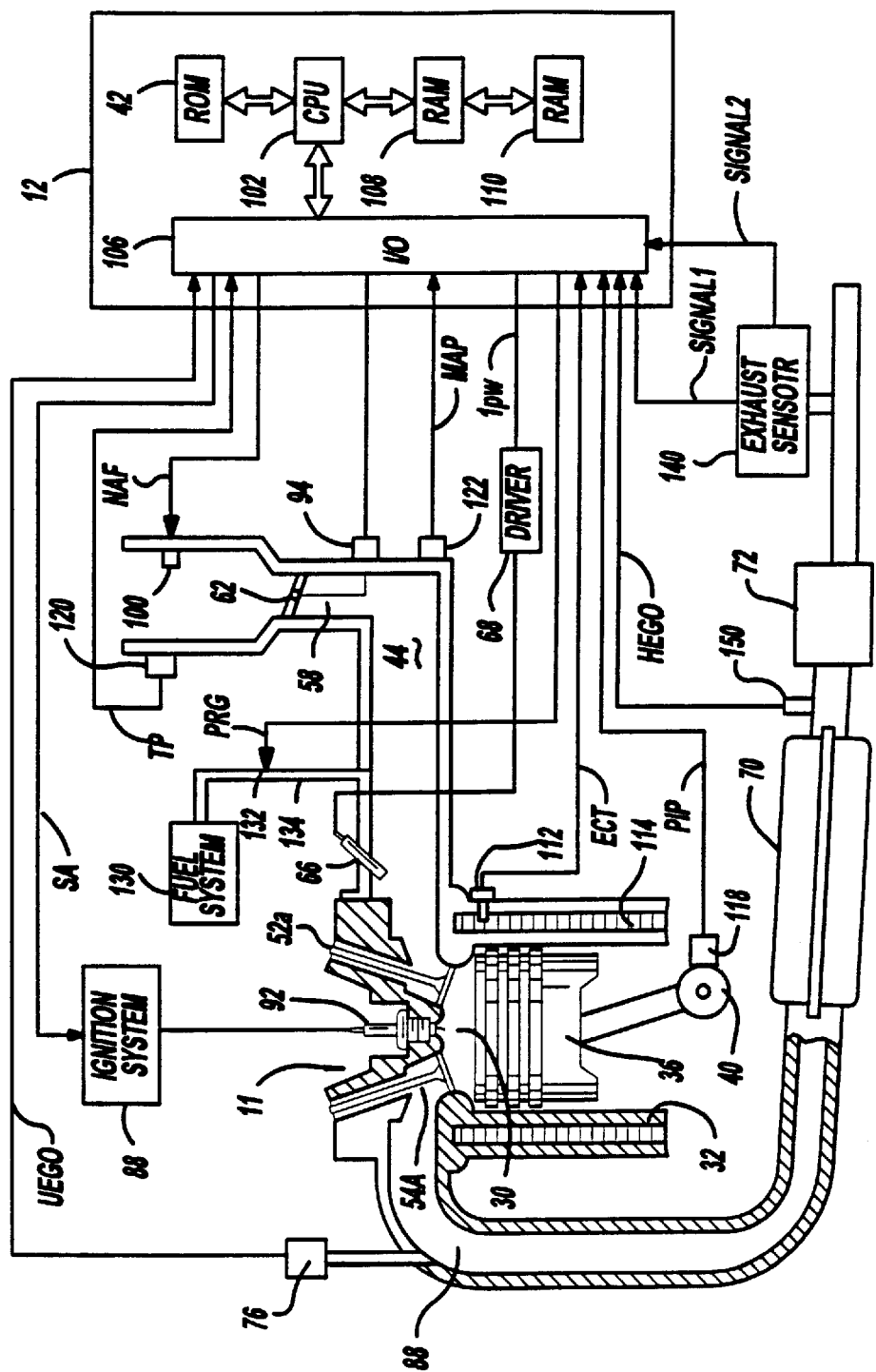
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In this particular example, the piston 30 includes a recess or bowl (not shown) for forming stratified charges of air and fuel. In addition, the combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio.

Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases. Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures. In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30.

An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx trap 72 is shown positioned downstream of catalytic converter 70. Both devices store exhaust gas components, such as NOx and oxidants, when engine 10 is operating lean of stoichiometry. The stored NOx and oxidants are subsequently reacted with HC and other reductant and are catalyzed during a purge cycle when controller 12 causes engine 10 to operate in either a rich mode or a near stoichiometric mode.

Exhaust gas oxygen sensor 150 is shown coupled to exhaust manifold 48 between the catalytic converter 70 and the NOx trap 72. In this particular example, sensor 150 provides signal HEGO to controller 12, and essentially serves as a switch providing information as to whether the air-fuel mixture is lean or rich at the mid-bed location.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2:
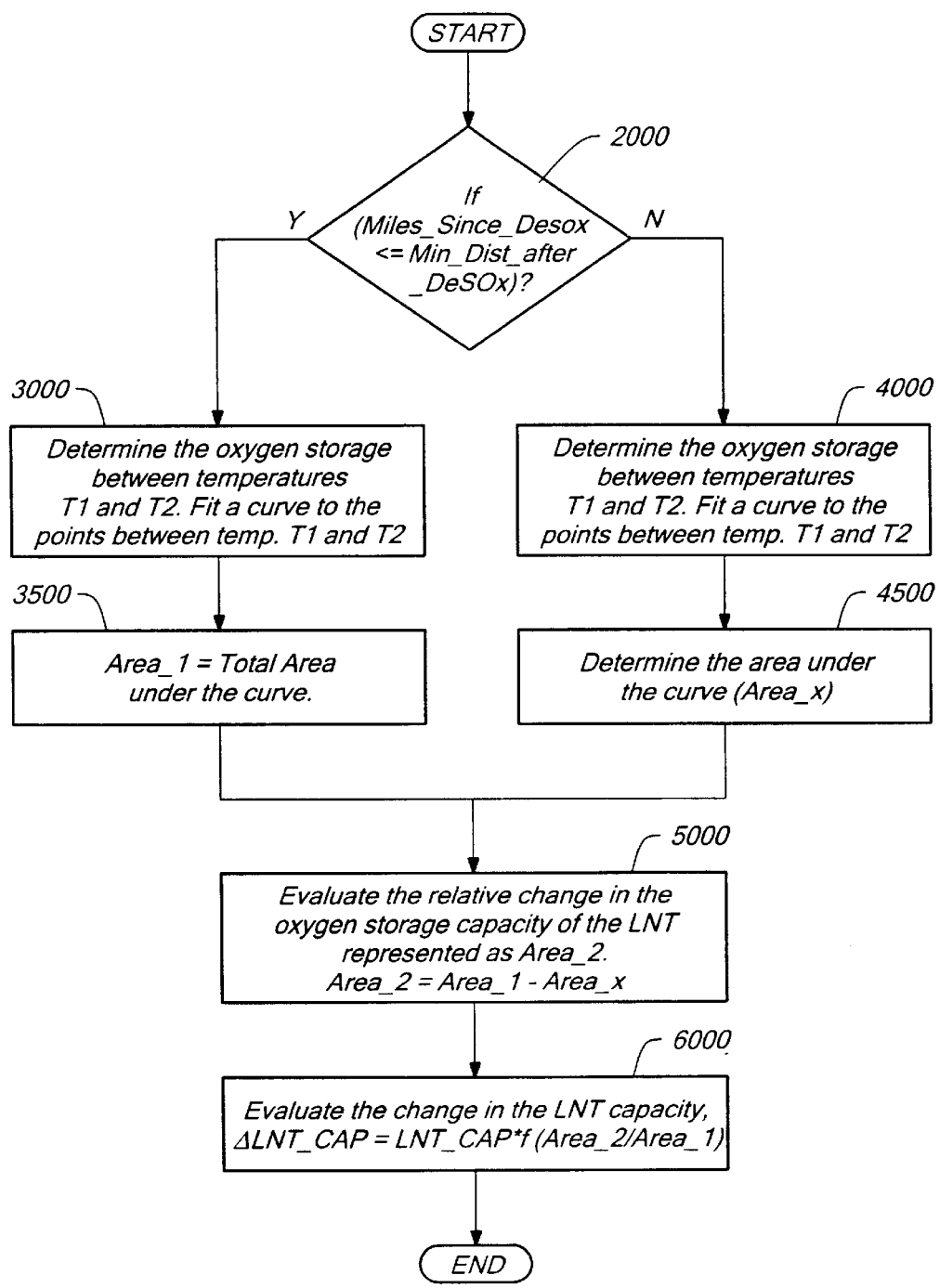
FIGS. 2 and 3 are block diagrams of the embodiment in which the invention is used to advantage.

The diagram in FIG. 2 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 2, first, in step 2000, a determination is made whether the distance traveled by a vehicle since last desulfation event is below a predetermined threshold value. Alternatively, in step 2000 a predetermined time constant could be used instead of the distance traveled. If the answer to step 2000 is YES, i.e., the LNT is assumed to be operating at full efficiency, the routine proceeds to step 3000 wherein oxygen storage capacity of the LNT is estimated at various temperature points during normal course of driving. An exemplary oxygen storage capacity calculation method is described later herein with particular reference to FIG. 3. Next, in step 3500, a best-fit curve is developed for the data obtained and area under the curve, Area_1, is calculated. In this particular example, Area_1 is a reference value indicative of LNT oxygen storage capacity shortly after a desulfation event, i.e., top efficiency. The routine then proceeds to step 5000. If the answer to step 2000 is NO, the routine proceeds to step 4000 wherein oxygen storage capacity of the LNT is estimated at various temperature points during normal course of driving. Once again, an exemplary oxygen storage capacity calculation method is described later herein with particular reference to FIG. 3. Next, in step 4500, a best-fit curve is developed for the data obtained and area under the curve, Area_x, is calculated. In this example, Area_x is representative of the current oxygen storage capacity of the LNT. The routine then proceeds to step 5000, wherein relative change in the LNT oxygen storage capacity, Area_2, is evaluated according to the following equation:

$$\text{Area\_2} = \text{Area\_1} - \text{Area\_x}$$

Next, in step 6000, the change in the LNT storage capacity due to sulfation is estimated according to the following equation:

$$\Delta\text{LNT\_CAP} = \text{LNT\_CAP} * f\left(\frac{\text{Area\_2}}{\text{Area\_1}}\right),$$

wherein LNT_CAP is a calibratable value indicative of maximum LNT storage capacity. The routine then exits.

Figure 3:
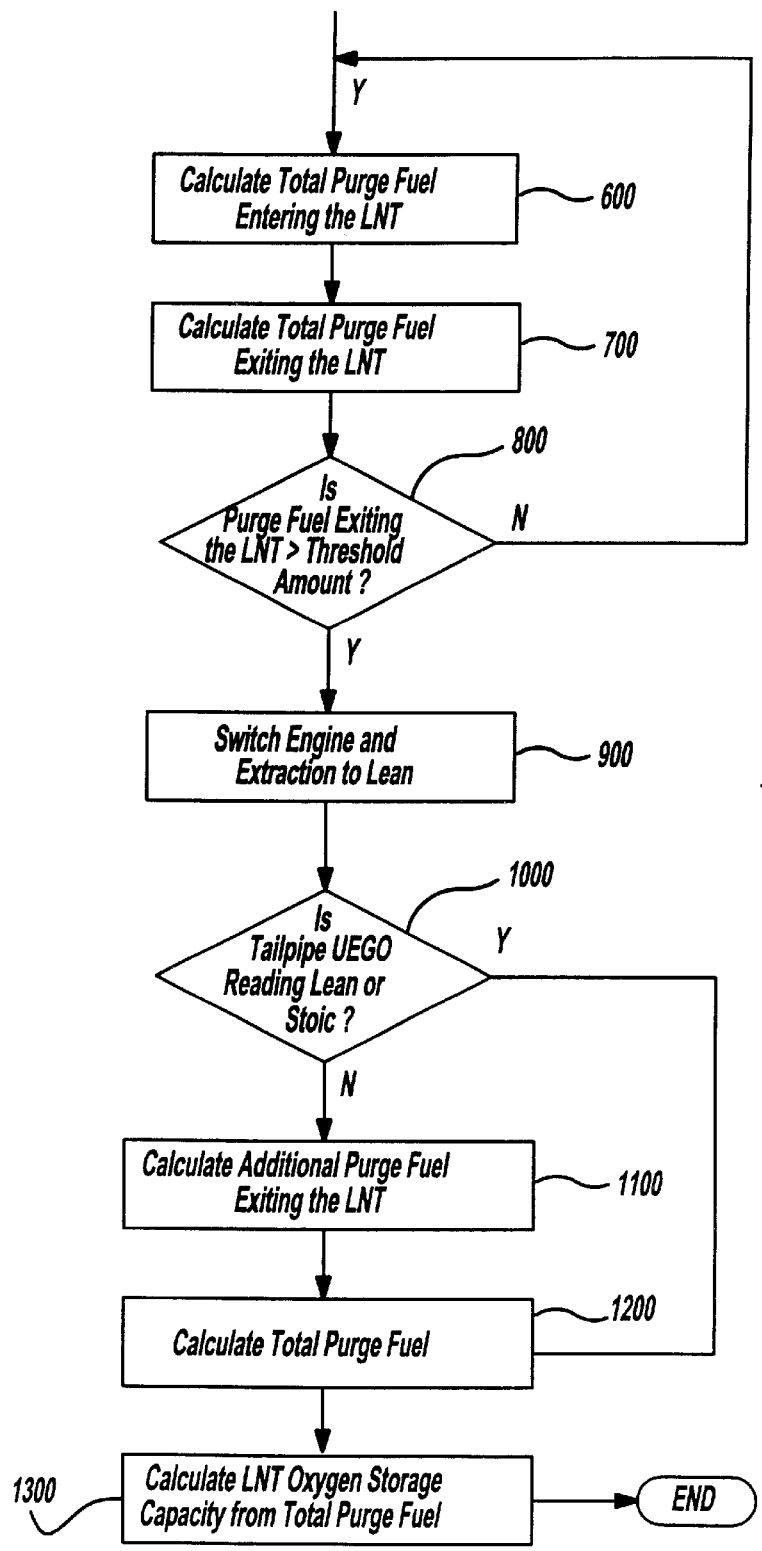

The diagram in FIG. 3 generally represents an embodiment of one of the exemplar methods of estimating oxygen storage capacity of the LNT. Other oxygen storage capacity methods could be used in order to generate best-fit curves described in FIG. 2 steps 4000 and 5000.

Referring now to FIG. 3, first, in a decision block 100 a determination is made whether the engine is operating at idle or low load conditions. If the answer is NO, the routing cycles through step 100, until the engine is at idle or low load conditions. Once the answer to decision block 100 is YES, the routine proceeds to step 200 wherein engine operation is switched to rich in order to purge stored exhaust gas components from the LNT. The purge is followed by lean operation in order to saturate the exhaust system with oxygen. Preferably, the engine is operated at its lean-limit so as to saturate the exhaust system as fast as possible. Next, in step 300, the output signal of the tailpipe UEGO sensor is compared to the output signal of the UEGO sensor upstream of the TWC. Once the two signals are within a predetermined constant of each other, i.e., close in value, meaning that the LNT is saturated with oxygen, then the answer to step 300 is YES, and the routine proceeds to step 400. Otherwise, the routine continues cycling through step 300.

Next, in step 400, the engine operation is switched to rich in order to purge the stored oxygen. The routine then proceeds to step 500 wherein a determination is made whether the HEGO sensor 150 has switched to reading rich, i.e., none of the purge fuel is being used to purge oxygen from the TWC. Once the answer to step 500 is YES, the routine proceeds to step 600 wherein the total amount of purge fuel, FG_FUEL_SUM, is calculated according to the following equation:

$$\text{FG\_FUEL\_SUM} = \frac{453.4 \text{ gm/lb}}{60 \text{ sec/min} \cdot 14.6} \int_{\text{start\_of\_purge}}^{\text{end\_of\_purge}} \text{Air\_Mass\_Flow} \cdot \left(\frac{1 - \text{FG\_Lambda}}{\text{FG\_Lambda}}\right) dt$$

where Air_Mass_Flow is measured in lbs/min and FG_LAMBDA is either the actual air-fuel ratio obtained from the feedgas UEGO sensor located upstream of the TWC or, instead, an open loop requested air-fuel ratio value.

Alternatively, the injector pulse-width information which provides a measure of the fuel injected in the cylinder in conjunction with the air mass flow rate information from the air meter can be used to calculate the amount of purge fuel entering the LNT.

Proceeding now to step 700, TP_FUEL_SUM1, the amount of purge fuel exiting the LNT is calculated according to the following equation:

$$\text{TP\_FUEL\_SUM1} = \frac{453.4 \text{ gm/lb}}{60 \text{ sec/min} \cdot 14.6} \int_{\text{start\_of\_purge}}^{\text{end\_of\_purge}} \text{Air\_Mass\_Flow} \cdot \left(\frac{1 - \text{TP\_Lambda}}{\text{TP\_Lambda}}\right) dt$$

wherein TP_Lambda is the tailpipe air-fuel ratio of the exhaust gas exiting the LNT obtained from the NOx/UEGO sensor 140.

The routine then proceeds to step 800 wherein a determination is made whether the amount of purge fuel exiting the LNT, TP_FUEL_SUM1, has exceeded a predetermined threshold amount, TPOXPGFUEL_MX. If the answer to step 800 is NO, indicating that purge fuel is still being used to reduce stored oxygen, and that the LNT is not fully purged yet, the routine returns to step 600 wherein the amounts of purge fuel entering and exiting the LNT are updated. If the answer to step 800 is YES, i.e., the oxygen purge is completed, the routine proceeds to step 900 wherein rich operation is terminated and stoic/lean air-fuel ratio is requested.

Next, the routine proceeds to step 1000 wherein a determination is made whether the SIGNAL1 (UEGO) output of the sensor 140 is reading lean or stoic. If the answer to step 1000 is NO, meaning purge fuel is still exiting the LNT, the additional purge fuel amount, TP_FUEL_SUM2, is calculated in step 1100 according to the following equation:

$$\text{TP\_FUEL\_SUM2} = \frac{453.4 \text{ gm/lb}}{60 \text{ sec/min} \cdot 14.6}$$

$$\int_{\text{end\_of\_purge}}^{(\text{end\_of\_purge})+t} \text{Air\_Mass\_Flow} \cdot \left(\frac{1 - \text{TP\_Lambda}}{\text{TP\_Lambda}}\right) dt$$

wherein t is the time it takes for the UEGO sensor to start reading stoic or lean after the end of the LNT NOx purge. The routine then proceeds to step 1200 wherein the net fuel used to purge the LNT of stored oxidants, OX_PG_FUEL, is calculated according to the following equation:

$$\text{OX\_PG\_FUEL} = \text{FG\_FUEL\_SUM} - (\text{TP\_FUEL\_SUM1} + \text{TP\_FUEL\_SUM2})$$

In other words, the total fuel required to purge the LNT of stored oxygen is the difference between the purge fuel entering the trap and the purge fuel exiting the trap.

If the answer to step 1000 is YES, i.e., no additional purge fuel is exiting the LNT, the routine proceeds directly to step 1200. Next, in step 1300, the amount of oxygen stored in the LNT is calculated as follows:

$$LNT\_OX\_CAP = OX\_PG\_FUEL \cdot FUEL\_TO\_OX\_FACTOR$$

wherein the conversion factor FUEL_TO_OX_FACTOR, is the amount of oxygen per gram of purge fuel. The routine then exits. Once several oxygen storage capacity estimates are performed at various operating temperatures, a best-fit curve can be generated as described earlier with particular reference to FIG. 2, steps 200 and 300.

Therefore, according to the preferred embodiment of the present invention, it is possible to monitor the efficiency of the LNT by comparing its oxidant storage capacity as a function of operating temperature to a reference estimate generated when the LNT is at peak efficiency (within a predetermined travel distance or time elapsed since the last desulfation event).

This concludes the description of the invention. The reading of it by those skilled in the art would bring to mind many alterations and modifications without departing from the spirit and the scope of the invention. Accordingly, it is intended that the scope of the invention be defined by the following claims.

What is claimed is:

1. A method for monitoring efficiency of an exhaust gas aftertreatment device disposed in an exhaust passage of an internal combustion engine, the method comprising:

generating a first device efficiency estimate by monitoring its oxidant storage capacity over on operating range of the device at a predetermined event after a purge has been performed on the device;

subsequently generating a second device efficiency estimate by monitoring said oxidant storage capacity over said operating range; and comparing said first estimate to said second estimate.

2. The method cited in claim 1, wherein said operating range of the device is a temperature range during normal driving conditions.

3. The method cited in claim 1, wherein the exhaust gas aftertreatment device is a three-way catalyst.

4. The method cited in claim 1, wherein said oxidant is oxygen.

5. The method cited in claim 1, wherein said first estimate is generated within a predetermined time constant following a SOx purge.

6. The method cited in claim 5, further comprising providing an indication of device efficiency based on said comparing.

7. A method of monitoring an efficiency of an exhaust gas aftertreatment device disposed in an exhaust passage of an internal combustion engine coupled to a vehicle, the method comprising:

restoring the device to an expected efficiency;

generating a first device efficiency estimate by monitoring its oxidant storage capacity over on operating range of the device after such efficiency restoration;

subsequently generating a second device efficiency estimate by monitoring said oxidant storage capacity over said operating range; and comparing said first estimate to said second estimate.

8. The method cited in claim 7, further comprising performing a SOx purge of the device if a result of said comparing is greater than a predetermined value.

9. The method as set forth in claim 7, wherein the exhaust gas aftertreatment device is a three-way catalyst.

10. The method as set forth in claim 7, wherein said device condition is achieved after the vehicle has traveled more than a predetermined distance following a SOx purge.

11. The method as set forth in claim 7, wherein said reference values are obtained when the vehicle has traveled less than a predetermined distance following a SOx purge.

12. A system for monitoring an efficiency of an exhaust gas aftertreatment device disposed in an exhaust passage of an internal combustion engine, the system comprising:

a sensor coupled downstream of the device; and a controller monitoring an output of said sensor over an operating range to generate an efficiency estimate, said controller comparing said efficiency estimate to a second efficiency estimate and providing an indication of the device efficiency based on said comparison.

13. The system cited in claim 12, wherein said device is a three-way catalyst.

14. The system cited in claim 12, wherein said sensor is an oxidant sensor.

15. The system cited in claim 12, wherein said oxidant is oxygen.

16. The system cited in claim 12, wherein said operating range is a temperature range of the device during normal operating conditions.

17. The system cited in claim 12, wherein said controller generates said reference estimate within a predetermined time constant following a SOx purge.

18. A method of monitoring an efficiency of an exhaust gas aftertreatment device disposed in an exhaust passage of an internal combustion engine coupled to a vehicle, the method comprising:

determining a first efficiency of the device based on at least two estimates of an amount of an oxidant stored in the device wherein said estimates are obtained at different operating temperatures of the device;

subsequently determining a second efficiency of the device based on at least two estimates of an amount of said oxidant stored in the device wherein said estimates are obtained at said different operating temperatures; and comparing said first efficiency to said second efficiency.

19. The method recited in claim 18, wherein said device in a three-way catalyst.

20. The method recited in claim 18, wherein said oxidant is oxygen.

* * * * *